United States Patent
Andaker et al.

(10) Patent No.: US 7,139,825 B2
(45) Date of Patent: Nov. 21, 2006

(54) SOURCE-SPECIFIC ELECTRONIC MESSAGE ADDRESSING

(75) Inventors: Kristian L. M. Andaker, Redmond, WA (US); Malcolm Davis, Kirkland, WA (US); David R. Fulmer, Redmond, WA (US); John L. Gibbon, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 10/262,626

(22) Filed: Sep. 30, 2002

(65) Prior Publication Data

US 2004/0064513 A1 Apr. 1, 2004

(51) Int. Cl.
*G06F 15/177* (2006.01)
(52) U.S. Cl. .................. 709/225; 709/245; 709/207; 713/168
(58) Field of Classification Search ................ 709/206, 709/245, 225, 207; 713/168
See application file for complete search history.

(56) References Cited

U.S. PATENT DOCUMENTS

| | | | |
|---|---|---|---|
| 5,956,521 A * | 9/1999 | Wang | 710/35 |
| 6,366,950 B1 * | 4/2002 | Scheussler et al. | 709/206 |
| 6,484,197 B1 | 11/2002 | Donohue | 709/206 |
| 6,591,291 B1 * | 7/2003 | Gabber et al. | 709/206 |
| 2001/0051990 A1 | 12/2001 | Shirakawa | 709/206 |
| 2003/0135573 A1 * | 7/2003 | Taylor | 709/207 |
| 2003/0200334 A1 * | 10/2003 | Grynberg | 709/245 |
| 2003/0236847 A1 * | 12/2003 | Benowitz et al. | 709/206 |
| 2004/0054887 A1 * | 3/2004 | Paulsen et al. | 713/154 |
| 2004/0243837 A1 * | 12/2004 | Fredette et al. | 713/201 |

OTHER PUBLICATIONS

Damming Spam [E-Mail Management] R. Safian, EDUCOM Review, vol. 34, No. 1, Educom, Jan.-Feb. 1999, USA, pp. 24-27.
True Anonymity Without Mixes C. Molina-Jimenez and L. Marshall, Proceedings. The Second IEEE Workshop on Internet Applications. WIAPP 2001,USA, pp. 32-40.
Hall, R.J. "How to Avoid Unwanted Email" Communications of the Association For Computing Machinery, Association for Computing Machinery. New York, Mar. 1, 1998. vol. 41, No. 3.

* cited by examiner

Primary Examiner—Rupal Dharia
Assistant Examiner—Djenane Bayard
(74) Attorney, Agent, or Firm—Workman Nydegger

(57) ABSTRACT

A recipient computer system submits an anonymous electronic message address to a source computing system for use when the source computing system is to send electronic messages to the recipient. When the electronic message server receives an electronic message, it reads the electronic message address and determines that the address corresponds to the recipient, but only if the electronic message originated from the source. If the electronic message were to originate from a different source computing system, the same electronic message address would not be respected for delivery to the recipient. Accordingly, the electronic message address is specific to a source, and thus sharing the electronic message address has little avail. The association between the address and the recipient may be revoked when the recipient no longer desires to receive messages from the source.

17 Claims, 3 Drawing Sheets

SOURCE-SPECIFIC ELECTRONIC MESSAGE ADDRESSING

BACKGROUND OF THE INVENTION

1. The Field of the Invention

The present invention relates to electronic messaging, and more particularly, to mechanisms for electronic message addressing in which the address of a given recipient depends on the source of the electronic message.

2. Related Technology

Computing technology has transformed the way we work and play. Modern computer networking technologies and infrastructures allow for different applications and users to communicate data electronically even over vast distances relatively quickly using readily-available computing systems. Such computing systems may include, for example, desktop computers, laptop computers, Personal Digital Assistants (PDAs), digital telephones, or the like.

Currently, computing systems are so interconnected that one computing system is literally capable of communicating with any one of many millions of other computing systems spread throughout the globe. Electronic messaging is a process whereby one computing system communicates with another whether the message be an e-mail message, an instant message, a Short-text Messaging Service (SMS) message, or any other electronic message.

One problem with the large degree of connectivity that modern networking technology affords is that almost anyone can send an electronic message to anyone else, so long as the recipients each have access to an addressable computing system. Unfortunately, however, some of the electronic messages are unwanted. Such electronic messages are often referred to as "spam". For example, sometimes one can receive unsolicited electronic messages in the form of advertisement of product the recipient is not interested in.

There are conventional methods for sending out mass quantities of spam. Accordingly, the use of electronic messaging is tainted since one often finds an in-box full of unwanted spam. It can be quite difficult to differentiate between spam and legitimate electronic messages since the subject line is often designed to appear legitimate such as "Re: in response to your query regarding your credit line", when, in fact, you did not issue any query and the spam contains an unsolicited and unwanted advertisement for a home equity loan. Unwanted electronic mail may even dominate over desired electronic messages in a typical user's in-box.

One fact that enables spamming is that individuals and entities who are highly motivated to generate and issue large quantities of spam often gain knowledge of a given user's electronic mail address. One can often avoid spamming by simply refusing to give out e-mail addresses. However, sometimes it is necessary to give out one's e-mail address. For example, perhaps one wants to subscribe to notifications of events of great interest to the user. Without giving out a legitimate electronic mail address, such desired notifications would never be received.

Even after giving out an electronic message address in order to receive notifications, one may thereafter lose interest in such notifications. Furthermore, the entity to whom the recipient subscribed may abuse the trust of the recipient by sending notifications or advertisement unrelated to the topic of interest to the user. Also, the entity may sell the electronic message address to others.

The problem of spam is so pervasive and intrusive, that some users have an electronic mail address that they give out publicly when subscribing to web sites or the like, while reserving another private electronic mail address that they only give out to trusted friends, family, or work associates. However, often who one trusts may dynamically change over time. For example, perhaps someone who has access to the private electronic mail address starts harassing or subscribes to a web site using the recipient's electronic mail address. Also, perhaps a web site becomes trusted to the recipient even though they were originally only provided with the public electronic mail address.

Accordingly, there is a need for a given recipient to control who is permitted to send electronic mail to the given recipient. The recipient may always unsubscribe from a web site that is sending spam. However, sometimes web sites do not respond to the unsubscribe request, and may even use the unsubscribe information to further harass the recipient. Furthermore, the web site may have already distributed the electronic mail address to others, leaving it to the recipient to figure out a way to stop unwanted electronic mail from those others sources as well.

Another problem with giving out an electronic mail address is that often behaviors and characteristics of the owner of the electronic mail address may be correlated through collaborative efforts of all those having knowledge of the electronic mail address. This owner of the electronic mail address may desire to keep his behavior and characteristics private.

Accordingly, mechanisms are desired that allow users more control over who is permitted to send electronic mail to the user, and that may allow electronic messaging without giving away information regarding the user.

BRIEF SUMMARY OF THE INVENTION

The principles of the present invention relate to mechanisms for performing source-specific electronic message addressing. A recipient computer system submits an anonymous electronic message address to an authorized source computing system for use when the source computing system is to send electronic messages to the recipient computing system. When an electronic message server associated with the recipient receives an electronic message, it reads the electronic message address and determines that the address corresponds to the recipient computing system, but only if the electronic message originated from the authorized source computing system. If the electronic message were to originate from a different source computing system, the same electronic message address would not be respected for delivery to the recipient computing system. Accordingly, the electronic message address is specific to an authorized source computing system, and thus sharing the electronic message address has little avail.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
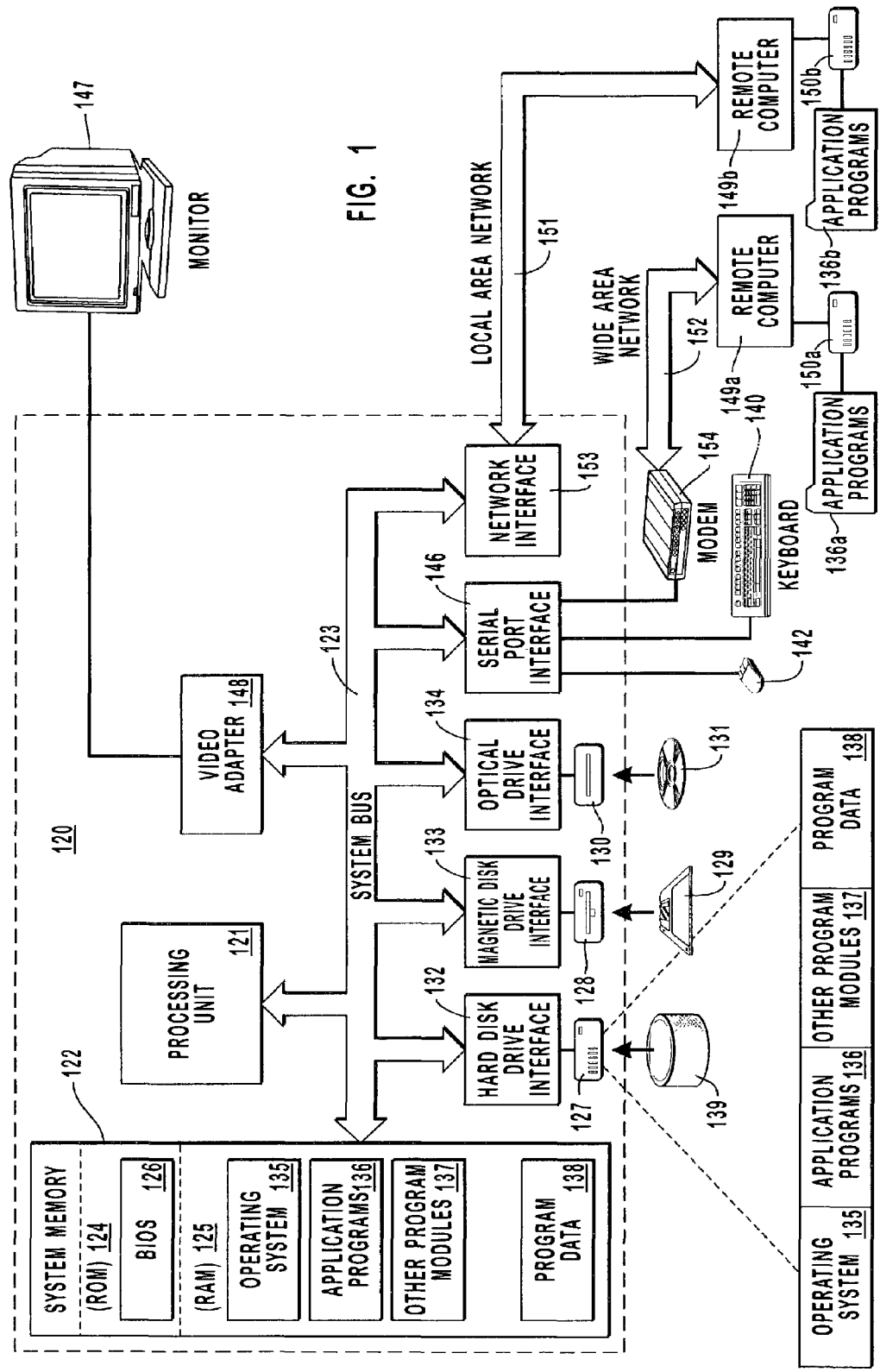
FIG. 1 illustrates a suitable computing system in which the principles of the present invention may be employed.

The principles of the present invention relate to methods, systems, and computer program products for performing electronic messaging in an environment in which multiple source computing systems communicate electronic messages with multiple recipient computing systems via an electronic message server. A recipient computer system submits an electronic message address to an authorized source computing system for use when the source computing system is to send electronic messages to the recipient computing system. When the electronic message server receives an electronic message, it reads the electronic message address and determines that the address corresponds to the recipient computing system, but only if the electronic message originated from the authorized source computing system. If the electronic message were to originate from a different source computing system, the same electronic message address would not be respected for delivery to the recipient computing system.

Accordingly, the electronic message address is specific to an authorized source computing system, and thus sharing the electronic message address has little avail. Also, since the electronic message address is different for each source computing system, the various source computing systems cannot determine that individual behaviors for any individual address are correlated, making it more difficult to identify behaviors and characteristics of the user of the recipient computing system. In one embodiment, the various electronic message addresses submitted by the recipient computing system to the various source computing systems may be devoid of any identifying information concerning the user of the recipient computing system, thus further protecting the privacy of the user. Furthermore, the source-specific electronic addresses may be revoked regardless of whether the source computing system respects the revocation.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, and the like, that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
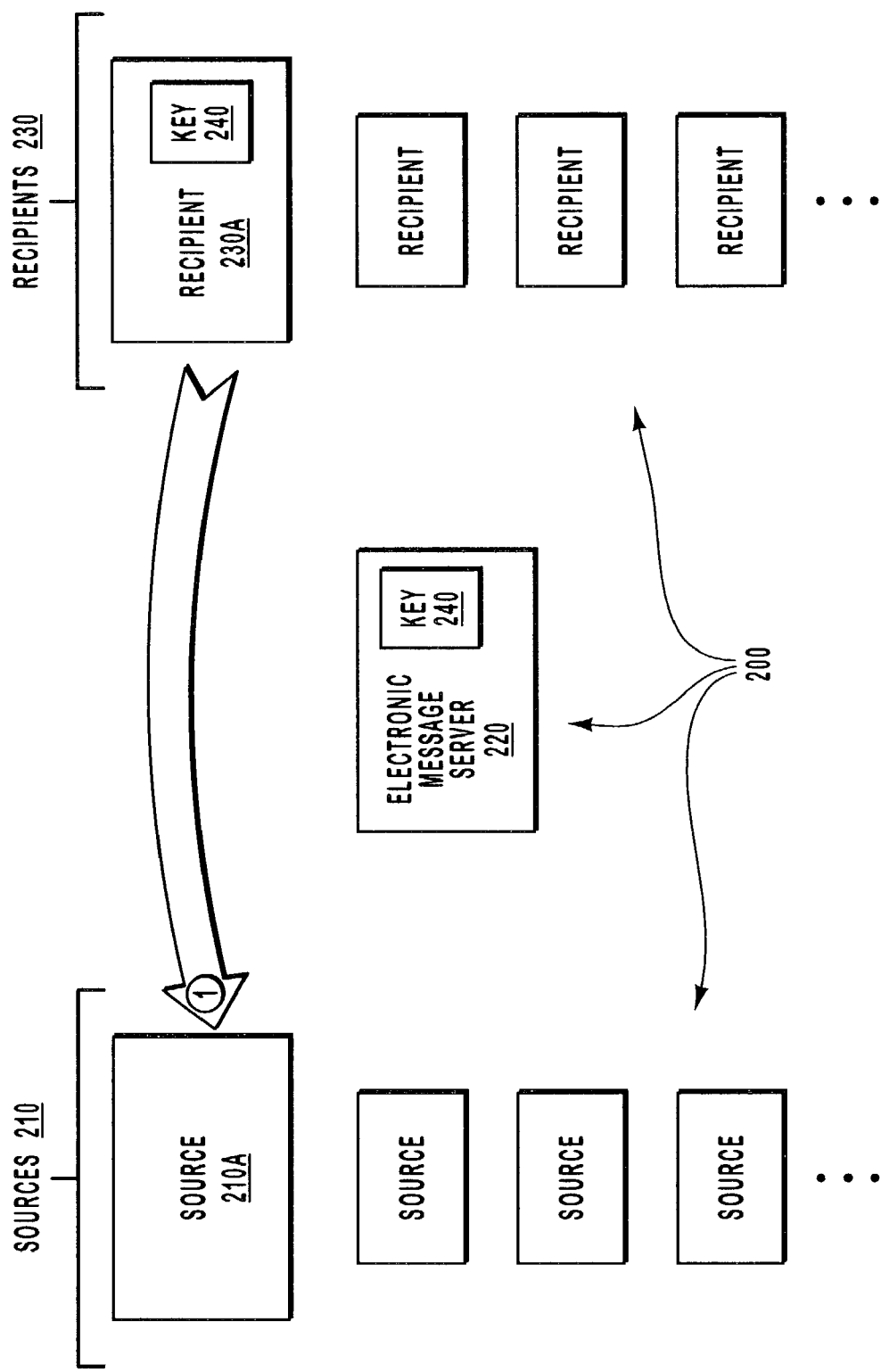
FIG. 2 illustrates a network environment in which the principles of the present invention may be employed.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. Throughout this description, element numbers begin with the same number as the figure in which the corresponding elements were first introduced. For example, all of the element numbers in FIG. 1 are numbered in the 100's while the element numbers in FIG. 2 are number in the 200's, and so forth. If the same element is re-illustrated in subsequent drawings, however, the corresponding reference number will remain the same.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined as any hardware component or components that are capable of using software to perform one or more functions. Examples of computing systems include desktop computers, laptop computers, Personal Digital Assistants (PDAs), telephones, or any other system or device that has processing capability.

In this description and in the claims, several terms are repeatedly used and thus are now defined for clarity. In this description and in the claims, an "electronic message" is defined as any message that may be communicated over a computer network. Such electronic messages may include data messages. In this description and in the claims, a "data message" is defined as any one of an e-mail message, an SMS message, or an instant message.

FIG. 2 illustrates a network environment 200 that represents a suitable operating environment for the principles of the present invention. The network environment 200 includes a number of electronic message source computing systems 210 that transmit electronic messages, and a number of electronic message recipient computing systems 230 that receive electronic messages. An electronic message server 220 receives electronic messages from the electronic message source computing systems 210 and routes the electronic message to one or more of the recipient computing systems 230. The network environment 200 may be, for example, the Internet. The electronic message server 220 may be, for example, a corporate e-mail server. The recipient computing systems 230 may be, for example, e-mail clients that are served by the electronic message server 220.

Figure 3:
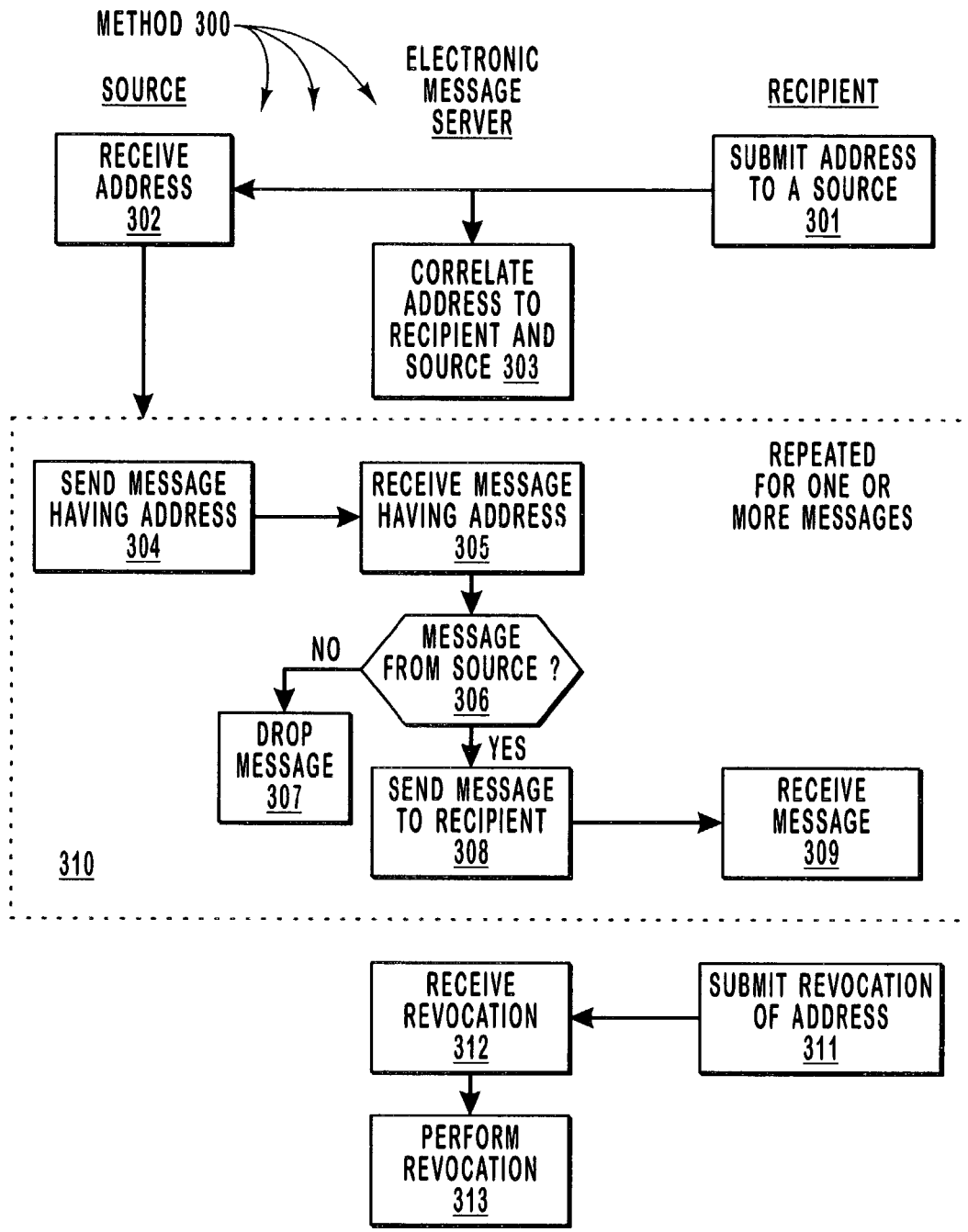
FIG. 3 illustrates a flowchart of a method for performing electronic messaging using source-specific addresses in accordance with the principles of the present invention.

FIG. 3 illustrates a flowchart of a method 300 for electronic message addressing in accordance with the principles of the present invention. As the method 300 may be implemented in the environment of FIG. 2, the method of FIG. 3 will be described with frequent reference to the environment of FIG. 2.

Some of the acts in the method 300 are performed by one of the recipient computing systems as represented in the right column of FIG. 3 under the heading "RECIPIENT", other acts are performed by the electronic message server as represented in the middle column of FIG. 3 under the heading "ELECTRONIC MESSAGE SERVER", and yet other acts are performed by the source computing system as represented in the left column of FIG. 3 under the heading "SOURCE".

The method 300 includes an act of a recipient computing system submitting an electronic message address to a source computing system (act 301) for use when the source computing system submits electronic messages to the recipient computing system. The source computing system thus becomes authorized to use the address to send electronic messages to the recipient computing system. The authorized source computing system thereupon receives the electronic mail address (act 302). For example, referring to FIG. 2, the recipient computing system 230A may submit an electronic mail address to source computing system 210A as represented by arrow 1.

The electronic message server 220 correlates the address to the recipient AND source (act 303). Accordingly, the electronic mail address is specific to the authorized source computing system 210A in the sense that the electronic mail address will only be recognized as corresponding to the recipient computing system 230A if the corresponding electronic message address originates from the authorized source computing system 210A.

The electronic message address preferably conceals the identity of the recipient and may include portions that are just a pseudo-random sequence of text characters. For example, one e-mail address may be "adf7adn93kdh3@ABCcorporation.com". The only thing that can be inferred from this e-mail address is that the recipient may potentially be within the ABC Corporation, although even that is not necessarily true. For example, the ABC Corporation may act as a service that filters out electronic messages for a number of recipient computing systems if the address in the electronic messages do not correlate to the respective recipient AND the source computing system.

The electronic message address may be generated by the recipient computing system 230A. In that case, the electronic message server 220 may make this correlation (act 303) when the recipient submits a notification that the recipient is going to send (or has sent) the electronic address to the source. FIG. 3 illustrates this embodiment in which the arrow from act 301 is submitted not only to act 302 representing the submission of the address, but also from act 301 to act 303 indicating that this same submission may cause the electronic message server to make the correlation. Alternatively, the electronic message server 220 may generate the electronic message address for the recipient computing system to submit to the server. In that case, act 303 may occur before act 301.

In one embodiment, the electronic message server 220 uses a key (e.g., key 240) to generate an address that the recipient computing system 230A may submit to the authorized source computing system 210A. In this description and in the claims, a "key" is defined as any sequence of one or more values and may include binary keys as well as text-based keys. The authorized source computing system 210A is not privy to the key 240. The electronic message computing system 220 may use the recipient's real electronic message address or some other recipient specific identifier such as a user name, as well as some information about the source computing system to generate a source-specific electronic message address using the key 240. When receiving the electronic message address, the key may be used to extract the source-specific information as well as the identity of the recipient. If the recipient computing system 230A generates the address, the recipient computing system 230A may use the key 240 to generate the address.

When using the key 240 to generate the address, once an electronic message is received by the electronic message server 220, the electronic message server 220 may infer the correlation based on the electronic mail address. For example, the key 240 may be used to extract the identity of the source and recipient computing systems 210A and 230A thereby allowing an inference to be made that the correlation had previously been allowed by the recipient computing system 230A.

Once the electronic message address is provided to the authorized source computing system 210A as represented by arrow 1, the source computing system 210A may then send one or more electronic messages having that address to the recipient computing system 230A via the electronic message server 220. The method within the dotted box 310 may then be performed for each such electronic message.

In particular, the source computing system sends an electronic message having the correlated address to the recipient computing system (act 304) via the electronic message server. Once the electronic message server 220 receives the electronic message (act 305), the electronic message server 220 determines whether the electronic message is from the authorized source computing system (decision block 306). This may be accomplished by simply reading a source address of the electronic message or by otherwise authenticating the source of the electronic message. At this same point, the electronic message server 220 may also determine whether the source computer system is still authorized to use the source address.

If the electronic message is not from the source or has a source address that has been revoked (NO in decision block 306), then the electronic message is dropped (act 307). This is appropriate since the recipient computing system limited the address for use by the source computing system. Accordingly, the recipient computing system is spared the inconvenience of having to receive an electronic message from a source that was not authorized to send electronic messages to the recipient.

As an additional advantage, if another source computing system attempts to use the same address that was authorized to only an authorized source computing system, the electronic message server may infer that the originally authorized source computing system intentionally or accidentally leaked the address to another computing system. From this information, the electronic message server may infer that the originally authorized source computing system 210A is not to be trusted with additional sensitive information.

Optionally, the electronic message server 220 may monitor address sharing for any number of corresponding recipient computing systems. If the electronic message server 220 detects that a particular source computing system is repeatedly leaking addresses for a number of different recipient computing systems, the electronic message server may optionally provide a warning to any recipient computing systems that have a current address correlated for that source, or provide a warning to any recipient computing system that requests an address from the electronic message server for use when subscribing to the suspect source.

If the electronic message is from the authorized source computing system and the authorization has not been revoked (YES in decision block 306), then the electronic message server 220 sends the electronic message (or a derivative thereof) to the recipient computing system 230A (act 308), whereupon the recipient computing system 230A receives the electronic message from the authorized source computing system 210A via the electronic message server 220 (act 309).

At any point after the recipient computing system 230A provided the source-specific electronic message address to the source computing system 210A, the recipient computing system 230A may revoke the source-specific address. This may be accomplished by the recipient computing system submitting the revocation to the electronic message server (act 311), which is then received by the electronic message server 220 (act 312). The electronic message server 220 then revokes any correlation between the electronic message address and the recipient computing system for the one or more source computing systems (act 313).

If the correlation between the electronic message address and the source and recipient where maintained in a correlation table, then revocation may be accomplished by removing the entry that correlates the address to the source and recipient. However, if the correlation was maintained using the key 240, then revocation occurs in a different manner. If the key 240 was just used for a single address, then revocation may occur by the electronic message server 220 marking the key as invalid. Otherwise, if the key 240 was used for generating multiple addresses, then a separate revocation table may be maintained. In that case, the electronic message server would also check the revocation table prior to potentially sending any electronic message to the recipient even if the use of the key did result in a correlation being found between the address and the source and recipient.

Regardless of how the mechanics of revocation occur, if the previously authorized source computing system were then to send an electronic message having the source-specific electronic message address, although that message would be received by the electronic message server, the message would be dropped without being forwarded to the recipient computing system. In one example, the revocation may occur a predetermined time period after the initial assignment or correlation of the electronic message address has been made.

The principles of the present invention allow for significant improvements in the state of the art of electronic messaging. Specifically, it limits the utility involved with selling an electronic message address since only the source computing system (or a closely affiliated and trusted computing system) may use the electronic mail address to send electronic messages to the recipient computing system. Furthermore, information from the electronic message address does not reveal much about the identity of the recipient computing system or associated user.

Also, since different source computing systems receive different source-specific electronic message address corresponding to any given recipient computing system, it is difficult, if not impossible, to collaboratively collect behavioral information or any other information about the user associated with the electronic message addresses.

In addition, if the source computing system abuses the privilege of having the source-specific address, or if for any other reason the user does not desire to receive any more electronic messages from the source computing system, the user may revoke the address with the revocation not depending on the source computing system honoring the revocation.

Finally, the electronic message server may learn of the lack of trustworthiness of the authorized source computing system if messages using the correlated address are subsequently received by unauthorized source computing systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment configured to control distribution of an electronic message address to unauthorized sources, a method of monitoring leakage of a source-specific address in order to prevent receipt of unsolicited electronic messages, the method comprising the following:
    an act of sending an electronic message address to a source computer system for using when the source computing system submits electronic messages to a recipient computing system;
    an act of making the electronic message address source-specific based on a correlation between identifiers for both the recipient computing system's address and the source computing system's address, wherein the electronic message address conceals the identity of the recipient computing system's address;
    an act of receiving an electronic message that includes the electronic message address from an unauthorized computing device not associated with the source computing system indicating that the source computing system inappropriately shared the electronic message address; and
    marking the source as untrusted such that additional source-specific electronic message addresses, other sensitive information, or both, will not be distributed to the source due to an abuse of a privilege of having a source-specific address.

2. A method in accordance with claim 1, further comprising the following:
    an act of the recipient computing system notifying the electronic message server of the correlation between the electronic message address and the source computing system.

3. A method in accordance with claim 1, further comprising the following:
    an act of the recipient computing system generating the electronic message address.

4. A method in accordance with claim 3, wherein the act of the recipient computing system generating the electronic message address comprises the following:
    an act of generating a pseudo-random sequence of characters for at least a portion of the electronic message address.

5. A method in accordance with claim 3, wherein the act of the recipient computing system generating the electronic message address comprises the following:
    an act of generating a sequence of characters based on a key that is shared between the recipient computing system and the electronic message server, but not with the source computing system.

6. A method in accordance with claim 1, wherein the electronic message is a data message.

7. A method in accordance with claim 1, wherein the electronic message is an e-mail.

8. A method in accordance with claim 1, wherein the electronic message is an instant message.

9. A method in accordance with claim 1, further comprising:
    an act of the recipient computing system communicating, to the electronic message server, a revocation of a correlation between the electronic message address and the source computing system.

10. A method in accordance with claim 1, further comprising:
    an act of the electronic message server revoking a correlation between the electronic message address and the source computing system after a predetermined time has elapsed since the correlation was made.

11. A method in accordance with claim 1, wherein based on the marking of the sources as untrusted the method further comprises:
    warning one or more recipient computing system—that have a current electronic message address correlated to the source—of the source's abuse of privilege of having the source-specific address.

12. A method in accordance with claim 1, wherein based on the marking of the sources as untrusted the method further comprises:
    receiving from another recipient a request for a source-specific address corresponding to the source; and
    warning the another recipient of the source's abuse of privilege of other allowed subscriptions for source-specific addresses.

13. A computer program product for use in a network environment configured to control distribution of an electronic message address to unauthorized sources, the computer program product for implementing a method of monitoring leakage of a source-specific address in order to prevent receipt of unsolicited electronic messages, the computer program product comprising one or more computer-readable media have thereon the following:

> computer-executable instructions for a recipient computing system causing an electronic message address to be sent to a source computer system for using when the source computing system submits electronic messages to the recipient computing system;
>
> computer-executable instructions for making the electronic message address source-specific based on a correlation between identifiers for both the recipient computer system's address and the source computing system's address, wherein the electronic message address conceals the identity of the recipient computing system's address;
>
> computer-executable instructions for the recipient computing system detecting the receipt of an electronic message that includes the electronic message address from an unauthorized computing device not associated with the source computing indicating that the source computing system inappropriately shared the electronic message address; and
>
> computer-executable instructions for marking the source as untrusted such that additional source-specific electronic message addresses, other sensitive information, or both, will not be distributed to the source due to an abuse of a privilege of having a source-specific address.

14. A computer program product in accordance with claim 13, wherein the one or more computer-readable media are physical storage media.

15. A computer program product in accordance with claim 13, wherein the one or more computer-readable media further have thereon the following:

> computer-executable instructions for the recipient computing system communicating, to the electronic message server, a revocation of a correlation between the electronic message address and the source computing system.

16. A computer program in accordance with claim 13, wherein based on the marking of the sources as untrusted the method further comprises:

> warning one or more recipient computing system—that have a current electronic message address correlated to the source—of the source's abuse of privilege of having the source-specific address.

17. A computer program in accordance with claim 13, wherein based on the marking of the sources as untrusted the method further comprises:

> receiving from another recipient a request for a source-specific address corresponding to the source; and
>
> warning the another recipient of the source's abuse of privilege of other allowed subscriptions for source-specific addresses.

* * * * *